June 28, 1927.

S. L. KELLY ET AL 1,633,863

ENGINE STARTER DRIVE

Filed March 29, 1926

3 Sheets-Sheet 1

Inventor
Sherman L. Kelly
and Lawrence E. Koos
By Faust F. Rampton
Attorney

June 28, 1927.

S. L. KELLY ET AL 1,633,863

ENGINE STARTER DRIVE

Filed March 29, 1926

3 Sheets-Sheet 2

Inventor
Sherman L. Kelly
and Lawrence E. Koos
By
Attorney

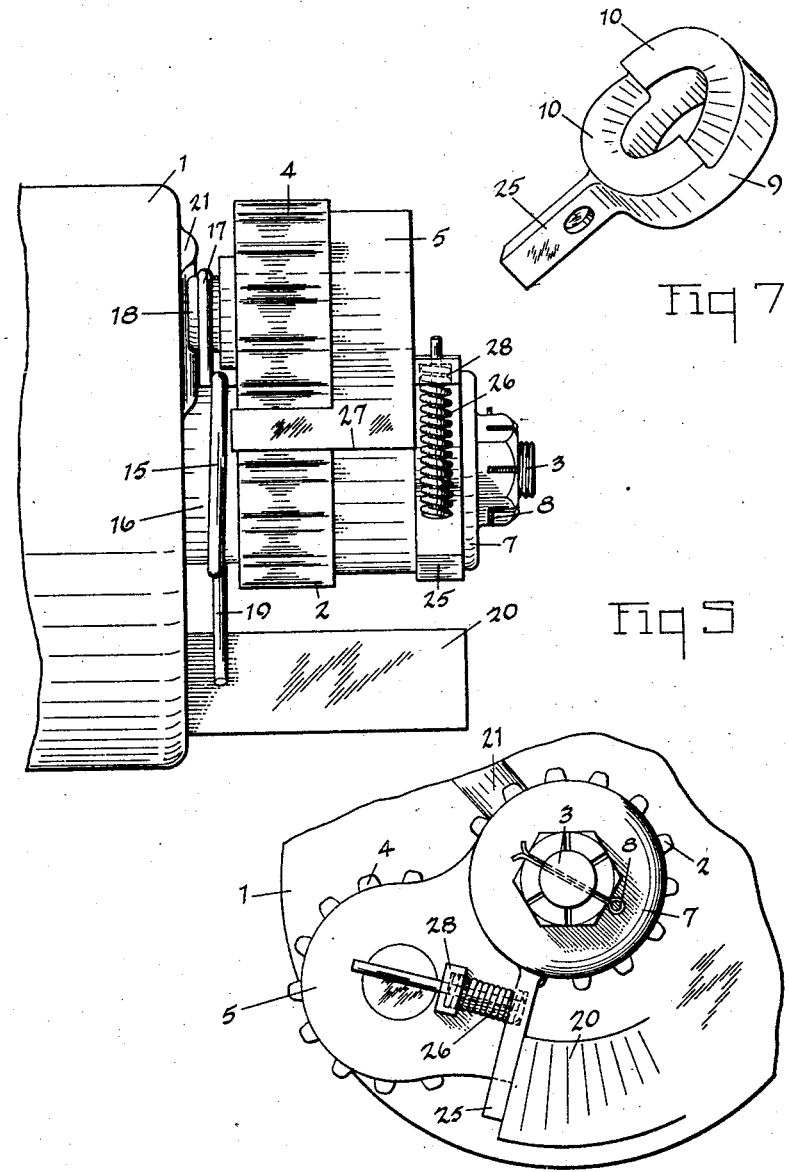

Patented June 28, 1927.

1,633,863

UNITED STATES PATENT OFFICE.

SHERMAN L. KELLY AND LAWRENCE E. KOOS, OF TOLEDO, OHIO.

ENGINE-STARTER DRIVE.

Application filed March 29, 1926. Serial No. 98,127.

Our invention has for its object to provide a starter mechanism for internal combustion engines which is operated by an electric motor and wherein an arm, having an idler gear may be releasably connected to the shaft of the electric motor whereby the arm will be rotated a short angular distance to complete the driving connection between the electric motor and the engine. The releasement and connection of the arm to the shaft of the motor is automatically controlled by the operation of the motor. In order to prevent clashing of the gears, the releasement of the arm is preferably produced slightly in advance of the gear connection between the pinion of the motor and the ring gear of the engine, the momentum of the arm thus produced causing its continued movement to place the idler in mesh with the ring gear. When the drive on the arm is released its speed or rate of movement is slightly reduced while the motor shaft is increased in speed and consequently the idler will be rotated at a slow speed due to the difference in speed of the arm and the shaft of the motor. This slow rotation of the idler will insure the entry or meshing of the teeth of the idler with the ring gear of the engine and without clashing of the gear.

The invention may be contained in starting mechanisms of different forms and to illustrate a practical application of the invention we have selected a structure containing the invention as an example of such structures and shall describe it hereinafter. The drive mechanism selected is shown in the accompanying drawings and is described hereinafter.

Figure 1:
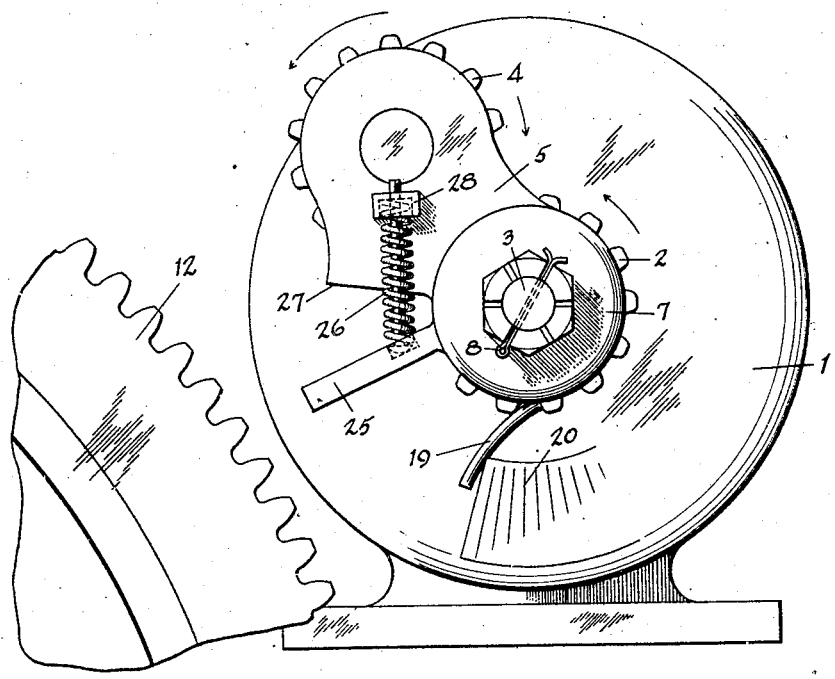
Figure 2:
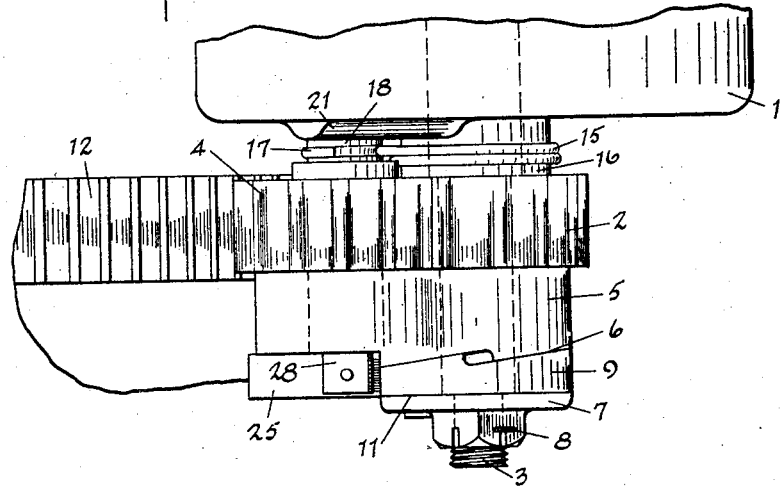
Figure 3:
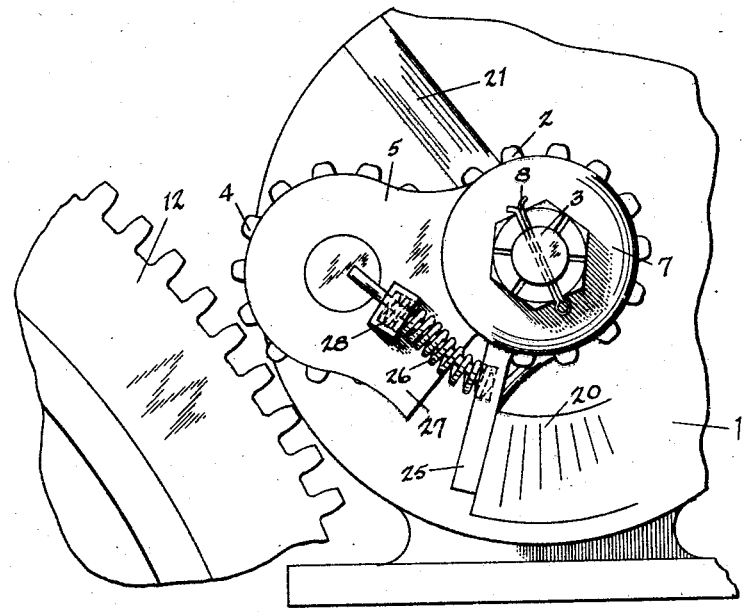
Figure 4:
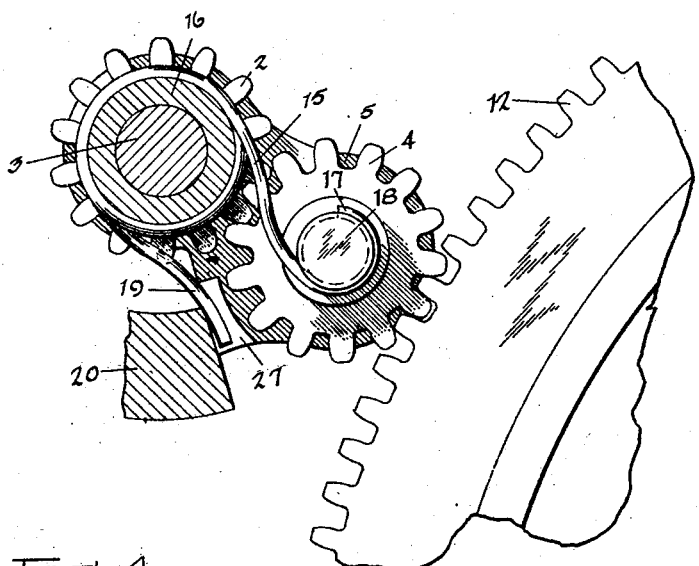

Figure 1 of the drawings is an end view of the motor located in position with reference to the ring gear of an internal combustion engine, a part of which is shown in the figure. Fig. 2 is a top view of the structure illustrated in Fig. 1. Fig. 3 illustrates the gear when the arm is in position of releasement from the shaft to the motor. Fig. 4 illustrates a view of a section showing the gear wheels when they are connected. Fig. 5 is a side view of the mechanism shown in Figs. 1 and 2. Fig. 6 is an end view of the mechanism when the gears are in the position indicated in Fig. 4, namely, when driving connection has been made. Fig. 7 is a perspective view of a clutch member for connecting the idler supporting arm to the shaft of the electric motor.

In the form of starting mechanism shown in the drawing, the electric motor 1 is suitably mounted on the engine shell or the chassis frame of the automobile so that the axis of the shaft is located parallel to the axis of the crank shaft of the engine. A pinion 2 is keyed to the electric motor shaft 3 and an idler 4 is mounted on an arm 5 that is located on the shaft 3. The arm 5 has a pair of cam surfaces 6 that are inclined to the axis of the shaft 3 while a disc 7 is keyed by means of the pin 8 to the shaft 3. A clutch member 9 has cam surfaces 10 that correspond to the cam surfaces that are formed on the arm 5 and so as to slidably engage the surfaces. The clutch member 9 also has the plane surface 11 that is located in opposition to the inner surface of the disc 7 and when the disc 7 is threaded on to the end of the shaft 3 and the arm 5 is located in its normal position, that is, so that its outer end is remote from the ring gear of the engine, the surfaces 11 of the clutch member 9 and the disc 7 will frictionally engage with each other to cause the rotation of the arm 5 with the shaft, the surfaces 6 and 10 being so located relative to each other that the clutch member 9 will tightly wedge between the disc and the arm 5 sufficient to cause the arm 5 to rotate with the motor shaft and carry the idler towards the ring gear 12 of the engine.

The movement of the arm 5 is yieldingly resisted by the spring 15 which surrounds the boss or bearing 16 of the motor shaft. It has one end 17 that engages a stub shaft 18 that is keyed to or otherwise secured in the arm 5 and the other end 19 that engages the stop 20 that protrudes prominently from the end of the motor shell or case. Movement of the arm 5 to swing the idler 4 is thus elastically resisted by the spring 15. A stop 21 may be formed on the end of the motor 1 which extends in the path of movement of the end of the stub shaft 18 against which the spring 15 will normally press the end of the shaft or towards which it will tend to move the arm 5 when the end of the shaft 18 is moved away from the stop 21. The wedging action of the clutch member 9, or the frictional engagement with the disc 7, is thus sufficiently great to swing the arm 5 downward towards the ring gear 12 against the resistance of the spring 15 and notwithstanding the inertia of the arm 5. Such movement, however, gives to the arm 5 a certain momentum which causes it to continue its rotation through a small angle notwithstanding the fact that the clutch engagement between the arm 5 and the shaft 3 is released sufficiently to permit rotation of the idler on the stub shaft 18 in advance of the meshing of the idler 4 with the ring gear 12. The clutch member 9 is provided with a finger 25 that engages the stop 20 in advance of the alinement of the centers of the gear wheels. The finger 25 is spring pressed by means of the spring 26 to normally maintain the clutch engagement between the arm 5 and the shaft 3 and when the finger 25 strikes the stop 20 a small angular movement of the finger 25 will release the arm 5 at least 5 or 6-1000 inch sufficient to permit rotation of the shaft relative to the arm 5. This releasement of the arm preferably occurs when the circumference of the ends of the teeth of the pinion 4 is close to but on the outside of the circumference of the ends of the teeth of the ring gear 12. The momentum induced in the arm 5 by the angular movement produced by the rotation of the shaft 3 will carry the arm sufficiently forward to place the idler 4 in position to mesh with the teeth of the ring gear, that is, to place the centers of the gear wheels in line. This forward movement of the arm 5 is stopped by means of the stop 20, the surface 27 of the arm engaging the stop 20. When the finger 25 strikes the stop 20 the spring 26 is compressed between the finger 25 and the boss 28 that is located on the arm 5. Also when the arm 5 is released from the shaft 3, the spring 15 resists the movement of the arm 5 towards the stop 20 and consequently the effect on the arm 5 is to reduce its momentum, that is, its speed of rotation about the axis of rotation and the pinion 2 operates on the idler 4 to rotate the idler 4 due to this difference in angular speed of rotation of the arm 5 and the shaft 3, so that as the arm 5 is moved towards the line joining the centers of the crank shaft of the engine and the shaft of the electric motor, the idler 4 will be slowly rotated so that its teeth will enter between the teeth of the stationary ring gear 12 and engage therewith when the arm 5 is brought to a stop. The speed of the idler will then become the same as that of the pinion and consequently the teeth of the idler will be held in its driving connection with the ring gear of the engine as long as work is being done in "turning over" the crank shaft. When, however, the engine picks up its speed so that it loosens the driving contact of the gear wheels the idler will be "kicked out" from the teeth of the ring gear of the engine.

If, however, the idler should not enter the teeth of the ring gear but the ends of the teeth of the idler should strike the ends of the teeth of the ring gear, the spring 15 will cause the arm to take such a position that the circumference of the outer ends of the teeth of the idler will be located just outside of the circumference of the outer end of the teeth of the ring gear. When the circuit of the motor is opened, the arm 5 will swing back to its normal position, namely, that position wherein the spring 26 will cause the clutch member 9 to frictionally connect the arm 9 to the shaft 3 of the motor. If then the circuit of the motor is closed, the arm 9 will be again swung downward towards the stop 20 and the teeth of the idler will be carried into meshing relation with the teeth of the ring gear 12.

We claim:

1. In an engine starter, a motor shaft, a pinion on the motor shaft, an arm located on the botor shaft, an idler pivotally supported on the arm and meshing with the pinion, a friction clutch member, the arm and the clutch member having a cam surface for movement of the arm and member longitudinally with respect to the shaft, a friction member secured to the shaft for frictionally engaging the clutch member for rotating the arm and the clutch member with the shaft, a means for operating the clutch member to release the arm, and the clutch member when the gears are in mesh.

2. In an engine starter, a motor shaft, a pinion on the motor shaft, an arm located on the motor shaft, an idler pivotally supported on the arm and meshing with the pinion, a friction clutch member, the arm and the clutch member having a cam surface for movement of the arm and member longitudinally with respect to the shaft, a friction member secured to the shaft for frictionally engaging the clutch member for rotating the arm and the clutch member with the shaft, an elastic means located intermediate the arm and the clutch member for normally frictionally connecting the arm to the shaft and a means for operating the clutch member to release the arm and the clutch member when the gears are in mesh.

3. In an engine starter, a motor shaft, a pinion on the motor shaft, an arm located on the motor shaft, an idler pivotally supported on the arm and meshing with the pinion, a friction clutch member, the arm and the clutch member having a cam surface for movement of the arm and member longitudinally with respect to the shaft, a friction member secured to the shaft for frictionally engaging the clutch member for rotating the arm and the clutch member with the shaft, an elastic means located intermediate the arm and the clutch member for normally frictionally connecting the arm to the shaft, and a stop engaged by the arm and by the clutch member for releasing the arm and the clutch member from the shaft.

4. In an engine starter, a motor shaft, a pinion on the motor shaft, an arm located on the motor shaft, an idler pivotally supported on the arm and meshing with the pinion, a friction clutch member, the arm and the clutch member having a cam surface for movement of the arm and member longitudinally with respect to the shaft, a friction member secured to the shaft for frictionally engaging the clutch member for rotating the arm and the clutch member with the shaft, an elastic means located intermediate the arm and the clutch member for normally frictionally connecting the arm to the shaft, and a stop engaged by the arm and by the clutch member for releasing the arm and the clutch member from the shaft, in advance of the engagement of the stop by the arm.

5. In an engine starter, a ring gear connected to the engine, a motor shaft, a pinion on the motor shaft, an arm located on the motor shaft, an idler pivotally supported on the arm and meshing with the pinion, a clutch member rotatably mounted on the motor shaft for locking the arm to the motor shaft, means for engaging the clutch member to release the arm from the motor shaft to permit the motor shaft to rotate relative to the arm and rotate the ring gear through the idler.

6. In an engine starter, the engine having a ring gear, a motor shaft, a pinion on the motor shaft, an arm located on the motor shaft, an idler pivotally supported on the arm and meshing with the pinion, a clutch member rotatably supported on the motor shaft and for locking the arm to the motor shaft, the clutch member having a finger, the motor having a stop for engaging the finger when the arm is rotated so as to move the idler towards the ring gear and for operating the clutch to release the arm from the motor shaft to permit the motor shaft to rotate relative to the arm and rotate the ring gear of the engine through the idler.

In testimony whereof we have hereunto signed our names to this specification.

SHERMAN L. KELLY.
LAWRENCE E. KOOS.